United States Patent
Asai et al.

(10) Patent No.: US 9,595,855 B2
(45) Date of Patent: Mar. 14, 2017

(54) RESIN GEAR DEVICE WITH RESIN LUBRICATING GREASE COMPOSITION

(71) Applicant: MINEBEA CO., LTD., Kitasaku-gun, Nagano (JP)

(72) Inventors: Yusuke Asai, Komoro (JP); Motoharu Akiyama, Saku (JP); Haruka Miyaji, Toyohashi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 499 days.

(21) Appl. No.: 14/193,282

(22) Filed: Feb. 28, 2014

(65) Prior Publication Data
US 2014/0239760 A1  Aug. 28, 2014

(30) Foreign Application Priority Data

Feb. 28, 2013 (JP) .................................. 2013-040021
Feb. 26, 2014 (JP) .................................. 2014-035390

(51) Int. Cl.
| | |
|---|---|
| *H02K 7/116* | (2006.01) |
| *F16C 33/66* | (2006.01) |
| *H02K 37/00* | (2006.01) |
| *F16H 57/04* | (2010.01) |

(52) U.S. Cl.
CPC .......... *H02K 7/116* (2013.01); *F16C 33/6633* (2013.01); *F16C 2361/61* (2013.01); *F16H 57/0464* (2013.01); *F16H 57/0495* (2013.01); *H02K 37/00* (2013.01)

(58) Field of Classification Search
CPC .............. F16C 2361/61; F16C 33/6633; F16H 57/0464; F16H 57/0495; H02K 37/00; H02K 7/116
USPC .......................................................... 310/83
See application file for complete search history.

(56) References Cited

U.S. PATENT DOCUMENTS

| | | | | |
|---|---|---|---|---|
| 5,840,666 | A * | 11/1998 | Yokouchi | C10M 169/00 252/77 |
| 8,003,582 | B2 * | 8/2011 | Mikami | B61F 17/30 508/110 |
| 2005/0261141 | A1 * | 11/2005 | Iso | B82Y 30/00 508/154 |

(Continued)

FOREIGN PATENT DOCUMENTS

| | | |
|---|---|---|
| DE | 603 07 052 T2 | 11/2006 |
| EP | 2 077 318 A1 | 7/2009 |

(Continued)

*Primary Examiner* — Alex W Mok
(74) *Attorney, Agent, or Firm* — Oliff PLC

(57) ABSTRACT

An actuator includes a stepping motor; a multi-stage gear device including a first stage gear attached to a rotation shaft of the motor, wherein a gear of each stage engages with a gear of a next stage; and a base member on which the multi-stage gear device and the stepping motor are mounted, wherein in the multi-stage gear device, a grease composition for resin is applied to a bearing part of the gear, and to an engaging part between the gears, and the grease composition for resin includes: (a) a base oil including a poly-alpha-olefin oil with a kinematic viscosity at 100° C. of 4 to 6 $mm^2/s$; (b) a thickening agent which is lithium soap; (c) a viscosity increasing agent; (d) a solid lubricant; and (e) an anti-wear agent, and wherein the NLGI consistency number of the composition is 00, 0, 1, or 2.

20 Claims, 4 Drawing Sheets

(56) References Cited

U.S. PATENT DOCUMENTS

| | | | | |
|---|---|---|---|---|
| 2009/0279824 A1* | 11/2009 | Mikami | ............... | C10M 169/00 384/462 |
| 2011/0136578 A1* | 6/2011 | Kawamura | ........ | C10M 169/044 464/15 |
| 2012/0277132 A1* | 11/2012 | Kohara | ................ | C10M 139/04 508/108 |

FOREIGN PATENT DOCUMENTS

| | | |
|---|---|---|
| JP | H04-500234 A | 1/1992 |
| JP | H10-71830 A | 3/1998 |
| JP | A-2002-327188 | 11/2002 |
| JP | 2004-297988 A | 10/2004 |
| JP | 2006-509899 A | 3/2006 |
| JP | A-2007-297422 | 11/2007 |
| JP | 2009-013351 A | 1/2009 |
| JP | 2011-089106 A | 5/2011 |
| JP | 2012-144715 A | 8/2012 |
| JP | A-2012-177105 | 9/2012 |
| WO | 90/15124 A1 | 12/1990 |

\* cited by examiner

RESIN GEAR DEVICE WITH RESIN LUBRICATING GREASE COMPOSITION

BACKGROUND

Technical Field

The present invention relates to a resin gear device with a resin lubricating grease composition applied and to an actuator provided with the resin gear device such as a multi-stage gear device. Here, the present invention particularly relates to a resin gear device used in an actuator for an air-conditioning ("Heating Ventilation and Air Conditioning"; hereinafter referred to as "HVAC") system for installation in a vehicle. In this application, the resin gear device means a device having at least one resin gear, i.e., at least one resin-made gear.

Related Art

In the current energy-saving boom of the automobile industry, the development of hybrid and electric automobiles has become imperative. By using a motor as the drive source, hybrid and electric automobiles have achieved great improvements in quietness compared to conventional gasoline automobiles. Thus, the conventional noise level in an actuator for a vehicle interior HVAC system is no longer compatible with the high level of quietness of hybrid and electric automobiles, and a need has arisen for an actuator whose noise level is further reduced.

Therefore, as one measure for reducing the noise of a gear device of an actuator or the like, gears made of a resin (hereinafter also referred to simply as "plastic gears") have begun to replace gears made of metal.

Plastic gears and sliding members made of a resin (plastic) are advantageous in that they are light, not easily affected by chemicals, do not rust, generate only a small operational noise level, and are self-lubricating. In addition, they are also advantageous in that they are suited to mass production and can be manufactured at low cost.

As a raw material for the plastic gears described above, a polyacetal (POM) resin, a polyamide (PA) resin, and a polybutylene terephthalate (PBT) resin are generally used. It is also known that the use of elastic gears made of a polyurethane rubber, an elastomeric material, or the like can achieve a noise reducing effect.

Meanwhile, in order to impart lubricity to the surfaces of the resin members such as plastic gears or the like, there are various proposals for grease compositions that are used on the engaging parts and the bearing part of a plastic gear in the same manner as in a metal gear. For example, the following grease compositions have been proposed: a grease composition including a base oil, a thickening agent, a fluorochemical surfactant, and a styrene block copolymer (JP 2007-297422 A), an oil non-separating lubricant composition in which the separation of oil is prevented by using a specific polymer material (JP 2002-327188 A), and a grease composition in which the separation of oil is suppressed under high temperature conditions (JP 2012-177105 A).

SUMMARY

As described above, a noise reducing effect can be achieved by replacing the resin raw material of a plastic gear with an elastic gear of a polyurethane rubber, an elastomeric material, or the like, but such elastic gears are not durable and have a short life as a gear device and thus present problems in practical application.

On the other hand, since the grease used on a plastic gear used in the actuator as described above is for installation in a vehicle, not only is the lubricating performance itself important but also the operability and starting performance in a low temperature environment of −40° C., and reduction in voltage is particularly desired in hybrid and electric automobiles. In addition, there is high demand for a grease that is reliable and has a longer life. Thus, there is a strong need for a grease composition that can satisfy all of the above-described desired performance.

With regard to the starting performance in a low temperature environment as described above, from the perspective of a grease composition, it is important to use a low-viscosity base oil in order to reduce the voltage during a low temperature start up. However, the amount of evaporation of such a grease composition is high and thus the need for a longer life cannot be satisfied. On the other hand, if a high-viscosity base oil is used, the evaporation characteristics are good and thus a longer life can be achieved, but a high voltage becomes necessary during a low temperature start up. Thus, in terms of the grease composition, there has been such a problem that it is extremely difficult to achieve both an improvement in starting performance in a low temperature environment as well as a longer life of the grease.

Further, synthetic hydrocarbon oils (poly-α-olefins) have generally been used as the base oil for a resin lubricating grease in order to avoid chemical attack on the resin material that constitutes the gears or the like. However, synthetic hydrocarbon oils are incompatible with thickening agents including lithium soap, and this leads to increased separation of the oil. Therefore, there have been such problems that the article is contaminated due to bleeding out of the oil and the quietness of the gears is impaired.

In addition, a resin pin or a metal shaft that is integrally molded with a case material has been used in a bearing part of an actuator gear. However, the resin wears out due to long term use, and glass fibers that are blended in order to increase the strength of the resin material may become exposed from the member surface. The hard glass fibers that are exposed cause further abrasive wear, which leads to an increase in the clearance between the gear and the bearing part, and this results in problems related to generation of vibrations and noise.

Moreover, a grease on the surface of a resin gear is removed from the contact surface due to use of the resin gear device over a long period of time, and this leads to such problems that the gears may vibrate on each other causing further increases in the noise level.

Thus, the present invention was created in consideration of the above-described circumstances, and an object thereof is to provide an actuator including a plastic gear device that can achieve both noise reduction and a longer life of the device by using a specific grease, particularly an actuator that is suited to HVAC systems and achieves the above effects in a low temperature environment.

As a result of keen examination in order to achieve the above-described object, the present inventors discovered that a grease composition which can achieve excellent low temperature starting performance and suppress oil separation can be obtained by using a low-viscosity base oil and using a styrene copolymer and/or a liquid isoprene rubber as a viscosity increasing agent.

The present inventors also discovered that a grease composition that enhances the wear resistance of a resin-made bearing part can be obtained by using polytetrafluoroethylene and melamine cyanurate as solid lubricants and using tricresyl phosphate or a polymeric ester as an anti-wear agent.

The present inventors further discovered that a reduction in noise and a longer life of the article can be achieved by applying a grease composition having the above-described constitutions to the engaging parts and the bearing parts of the gears of a gear device that constitutes an actuator, thereby completing the present invention.

According to the present invention, there is provided an actuator including: a stepping motor; a multi-stage gear device for decelerating a rotation of the stepping motor in order so as to increase rotational torque, including a first stage gear attached to a rotation shaft of the motor, wherein a gear of each stage engages with a gear of a next stage; and a base member on which the multi-stage gear device and the stepping motor are mounted, wherein in the multi-stage gear device, a grease composition for resin is applied to a bearing part of the gear of each stage, and to an engaging part between the gears, and the grease composition for resin includes: (a) a base oil including a poly-alpha-olefin oil with a kinematic viscosity at 100° C. of 4 to 6 mm$^2$/s; (b) a thickening agent which is lithium soap; (c) a viscosity increasing agent; (d) a solid lubricant; and (e) an anti-wear agent, and wherein the NLGI consistency number of the composition is 00, 0, 1, or 2.

Further, according to the present invention, there is provided an actuator comprising: a motor; a multi-stage gear device, including a first stage gear attached to a rotation shaft of the motor, wherein a gear of each stage engages with a gear of a next stage; and a base member on which the multi-stage gear device and the motor are mounted, wherein a grease composition for resin is applied to an engaging part between the gears, and the grease composition for resin includes: (a) a base oil including a poly-alpha-olefin oil with a kinematic viscosity at 100° C. of 4 to 6 mm$^2$/s; (b) a thickening agent which is lithium soap; (c) a viscosity increasing agent; (d) a solid lubricant; and (e) an anti-wear agent, and wherein the NLGI consistency number of the composition is 00, 0, 1, or 2.

Still further, according to the present invention, there is provided a gear device at least comprising: a first stage gear attached to a rotation shaft of a motor; and a second stage gear engaging with the first stage gear; wherein at least one of the first stage gear and the second stage gear is resin-made, and a grease composition is applied to at least an engaging part between the first stage gear and the second stage gear, and wherein the grease composition includes: (a) a base oil including a poly-alpha-olefin oil with a kinematic viscosity at 100° C. of 4 to 6 mm$^2$/s; (b) a thickening agent which is lithium soap; (c) a viscosity increasing agent; (d) a solid lubricant; and (e) an anti-wear agent, and wherein the NLGI consistency number of the composition is 00, 0, 1, or 2.

It is preferable that the (c) viscosity increasing agent includes any one or both of a styrene-isoprene resin and a liquid isoprene rubber.

Herein, if the (c) viscosity increasing agent includes either one of a styrene-isoprene resin and a liquid isoprene rubber, the styrene-isoprene resin is preferably included at a proportion of 0.5% by mass to 6% by mass or the liquid isoprene rubber is preferably included at a proportion of 5% by mass to 12% by mass based on the total mass of the grease composition for resin.

Alternatively, if the (c) viscosity increasing agent includes both a styrene-isoprene resin and a liquid isoprene rubber, they are preferably included at a proportion such that the mass ratio of the liquid isoprene rubber in relation to the styrene-isoprene resin is in the range of 2 to 5. At this time, a mixed viscosity increasing component of the styrene-isoprene resin and the liquid isoprene rubber is preferably included at a proportion of 0.9% by mass to 12% by mass based on the total mass of the grease composition for resin.

Further, it is preferable that the (d) solid lubricant includes melamine cyanurate and polytetrafluoroethylene such that a mass ratio of melamine cyanurate in relation to polytetrafluoroethylene is in the range of 0.6 to 9, and a mixed lubricating component of the melamine cyanurate and the polytetrafluoroethylene is included at a proportion of 2% by mass to 10% by mass based on the total mass of the grease composition for resin.

Particularly, it is preferable that the (d) solid lubricant consists of melamine cyanurate and polytetrafluoroethylene.

Further, it is preferable that the (e) anti-wear agent includes any one or both of tricresyl phosphate and a polymeric ester, and any one or both of the tricresyl phosphate and the polymeric ester are included at a proportion of 0.5% by mass to 3% by mass based on the total mass of the grease composition for resin.

According to the present invention, by using a grease composition for resin having the above-described constitutions on a multi-stage gear device and a gear device for resin, a gear device can be provided in which backlash of the engaging parts and the bearing parts of the gears due to wear is reduced and both noise reduction and a longer life of the article are achieved, and an actuator including such a gear device can also be provided. In particular, with regard to noise, the actuator of the present invention having the above-described constitutions can decrease the difference in noise levels between forward rotation and reverse rotation and achieve a significant auditory effect, and this also leads to quality enhancement of the article itself in which the actuator is installed.

In particular, the actuator of the present invention can provide excellent starting performance (voltage reduction) in a low temperature environment.

DETAILED DESCRIPTION

In general, in an actuator that is constituted by a stepping motor and a multi-stage gear device constituted by at least a plurality of gear stages that decelerate the rotation of the stepping motor in order to increase rotational torque, when a first stage gear and a second stage gear mounted at one end of a motor rotation shaft engage and rotate, the motor becomes a source of vibration. The vibration of the motor propagates through the shaft and base member as well as the outer casing to vibrate the gears, and this vibration is linked to the generation of periodic sound when the gears engage with each other. Given the structure of an actuator, the gears cannot be linearly aligned, and thus the periodic sound generates a difference in the vibration and acoustic pressure due to a difference in the rotation directions. Vibrational sounds of the rotation direction in which the vibrational acoustic pressure is large strike the ears as noise. Further, gaps occur due to wear of bearing part, and this also causes vibrations and noise.

In order to reduce noise caused by a motor and a gear device in the actuator as described above, the present inventors utilized a grease composition in which a liquid isoprene rubber component or a styrene block copolymer is particularly blended as a viscosity increasing agent and applied this grease composition to the engaging parts of the gears and the bearing parts of the gears. Thereby, the present inventors obtained an actuator in which the covering capability of the grease over the above-mentioned portions is excellent and the wear of the engaging parts of the gears and the bearing parts of the gears can be reduced, and which achieves both noise reduction and a longer article life, thereby completing the present invention.

Modes for carrying out the present invention (hereinafter referred to as "embodiments") will be explained in detail below referring to the attached drawings.

Note that "a multi-stage gear device" described in this application means a device having gears where at least one of the gears is made of resin. In other words, the multi-stage gear device mounted in an actuator according to the present invention may be configured to have both the resin-made gears and gears made of any non-resin materials such as metals in combination. Further, the multi-stage gear device is of course configurable with only the resin-made gears. In an embodiment according to the present invention, a resin lubricating grease composition to be explained later may be applied to the bearing part of a resin-made gear, and to the engaging part between a resin-made gear and a gear made of resin or any other material.

Figure 1:
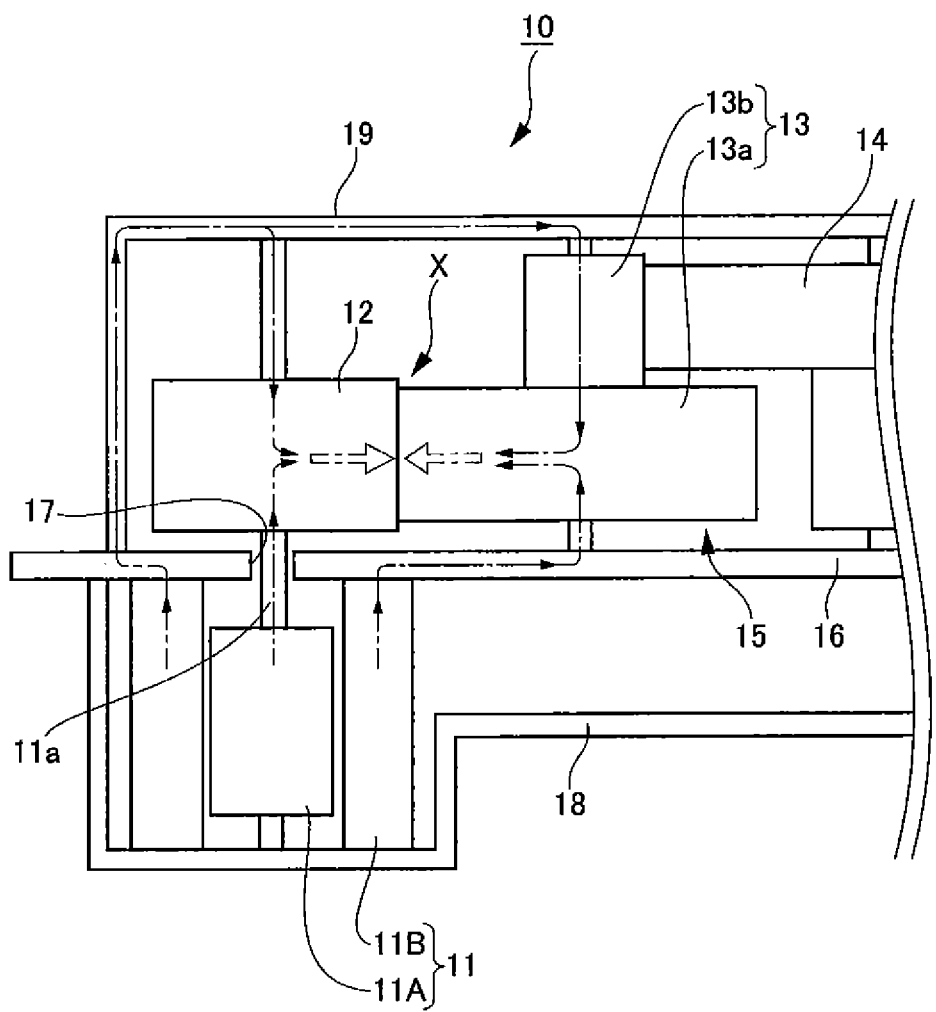
FIG. 1 is a schematic view for explaining the essential structure of an actuator of the present invention.

FIG. 1 is a schematic view for explaining the essential structure of an actuator, which is an embodiment of the present invention.

An actuator 10 shown in FIG. 1 is an actuator for an HVAC system. The actuator 10 includes a stepping motor 11 and a multi-stage gear device 15 having a plurality of gear stages such as a first stage gear 12 that is attached to an output shaft 11a of the stepping motor 11 such that it can rotate integrally therewith, a second stage gear 13 that is engaged with the first stage gear 12, a third stage gear 14 that is engaged with the second stage gear 13, and so on. With this structure, the rotation of the stepping motor 11 is decelerated in the order of the first stage gear 12, the second stage gear 13, the third stage gear 14, etc. and then is output to an external equipment side (not illustrated).

The stepping motor 11 includes a rotor 11A and a stator 11B that is arranged around the outer periphery of the rotor 11A. The stepping motor 11 is mounted in an upright manner at one surface side of a base member 16.

The multi-stage gear device 15 is mounted on the other surface side of the base member 16 so as to correspond to the stepping motor 11. The first stage gear 12 is attached to the output shaft 11a of the stepping motor 11 which passes through a hole 17 from the one surface side of the base member 16 to project to the other surface side, i.e. the multi-stage gear device 15 side.

On the outside of the stepping motor 11, a first outer casing member 18 that retains the stepping motor 11 from the outside is arranged facing the base member 16. At the outside of the multi-stage gear device 15, a second outer casing member 19 that retains the multi-stage gear device 15 from the outside is arranged facing the base member 16. In other words, the output shaft 11a of the stepping motor 11 and each rotation shaft of the multi-stage gear device 15 are each supported by the base member 16, the first outer casing member 18, and the second outer casing member 19. The first outer casing member 18 and the second outer casing member 19 are joined together to constitute a case for the actuator 10.

The second stage gear 13 includes a first gear part 13a and a second gear part 13b that are directly coupled to each other in the axial direction. The first gear part 13a is engaged with the first stage gear 12 and the second gear part 13b is engaged with the third stage gear 14. The first gear part 13a and the second gear part 13b are preferably made to be integrally molded, but they can also be molded individually and then subsequently integrated.

As explained above, in the actuator 10 of the present embodiment, when the stepping motor 11 rotates, vibrations that are generated in the stepping motor 11 are transmitted to the first stage gear 12 and the second stage gear as shown by the dashed lines in FIG. 1. The vibrations ultimately converge at an engaging part (engaging location) X between the first stage gear 12 and the second stage gear 13, and a loud periodic sound is generated at the engaging part X. Further, a difference in the vibration and the acoustic pressure is generated by the difference in the rotation directions of the first stage gear 12 and the second stage gear 13, and vibrational sounds of the rotation direction in which the vibrational acoustic pressure is high strike the ears as noise.

Thus, in the present embodiment, a grease composition to be explained later is used on the engaging parts of the gears and the bearing parts of the gears in order to reduce noise and extend the life of the article.

Figure 2A:
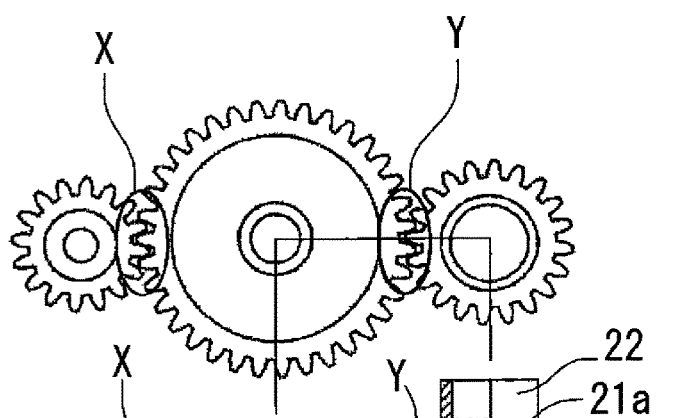
FIG. 2A presents more detailed schematic views of a multi-stage gear device in the actuator of the present invention, and is a front view of the multi-stage gear device.
Figure 2B:
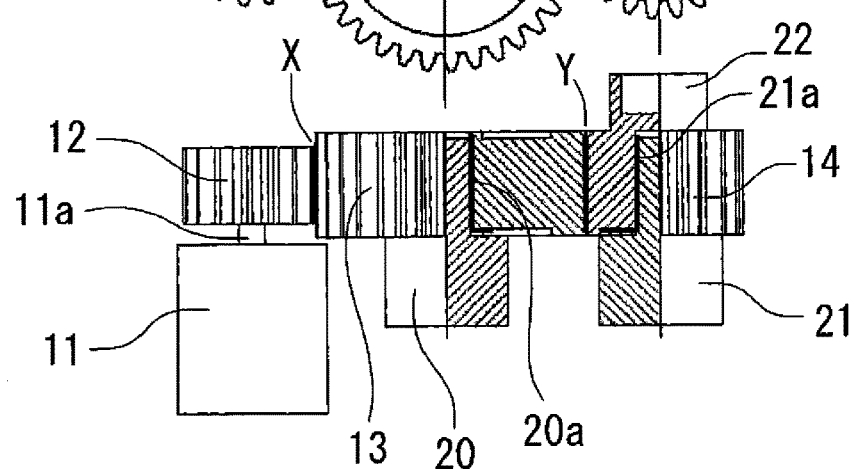
FIG. 2B presents more detailed schematic views of a multi-stage gear device in the actuator of the present invention, and is a side view (including a partial cross-section) of the multi-stage gear device.

FIG. 2 presents more detailed schematic views of the multi-stage gear device in the actuator, which is an embodiment of the present invention. FIG. 2A is a front view of the multi-stage gear device, and FIG. 2B is a side view (including a partial cross-section) of the multi-stage gear device. Similar to FIG. 1, the first stage gear 12 attached to the output shaft 11a of the stepping motor 11 such that it can rotate integrally therewith, the second stage gear 13 that is engaged with the first stage gear 12, and the third stage gear 14 that is engaged with the second stage gear 13 are illustrated. In FIG. 2, a shaft 20 of the second stage gear 13 and a shaft 21 of the third stage gear 14 are also illustrated, and an actuator output shaft 22 is further illustrated.

In the present embodiment, the grease composition to be explained later is applied to the engaging part X between the first stage gear 12 and the second stage gear 13, an engaging part Y between the second stage gear 13 and the third stage gear 14, the bearing part 20a of the second stage gear 13 and the bearing part 21a of the third stage gear 14 illustrated in FIG. 2. Here, a grease application portion is configured on each portion identified above.

Here, in an actuator according to the present invention, the shafts configuring the actuator, that is, the output shaft of the motor, each shaft of the multi-stage gear device, and the output shaft of the actuator may be metal-made or resin-made.

In the above regard, for example, as shown in the above two embodiments of FIGS. 1 and 2, the output shaft 11a of the stepping motor 11 of the actuator 10 is a rotatable metal shaft. The output shaft 11a and the first stage gear 12 are fixed to each other. The first stage gear 12 rotates together with the output shaft 11a. Therefore, there is no bearing part therebetween where the relative rotation of the first stage gear 12 and the output shaft 11a occurs.

On the other hand, the shaft 20 of the second stage gear 13 and the shaft 21 of the third stage gear 14 are fixed shafts which are both made of resin. The second stage gear and the third stage gear are rotated by sliding in relation to the respective fixed shafts. Accordingly, in addition to the engaging parts X and Y, the grease composition to be explained later is applied to both the bearing part 20a between the second stage gear 13 and the shaft 20 (a fixed shaft) of the second stage gear, and the bearing part 21a between the third stage gear 14 and the shaft 21 (a fixed shaft) of the third stage gear.

As a resin suitable for the above-mentioned resin members that constitute the actuator (the output shaft of a motor, gears, the shaft of the gears, a base member, an outer casing member (a case), the output shaft of an actuator, and the like), mention may be made of polyethylene (PE), polypropylene (PP), an ABS resin (ABS), polyacetal (POM), nylon (PA), polycarbonate (PC), a phenol resin (PF), polyethylene terephthalate (PET), polybutylene terephthalate (PBT), polyphenylene sulfide (PPS), polyethersulfone (PES), polyimide (PI), polyether ether ketone (PEEK), and the like.

The grease composition for resin used in the actuator of the present invention includes (a) a base oil, (b) a thickening agent, (c) a viscosity increasing agent, (d) a solid lubricant, and (e) an anti-wear agent. The NLGI consistency number of the grease composition for resin is 00, 0, 1, or 2 (in other words, within the range of approximately 430 to 260 in terms of the worked penetration range). If the grease is any softer, the grease may leak during use, and if the grease is any harder, it may fail to remain on the contact surface.

For the (a) base oil, a low-viscosity synthetic hydrocarbon oil is preferably used. Specifically, the (a) base oil used in the present invention includes a poly-alpha-olefin oil (hereinafter also abbreviated as "PAO"). In the present invention, the base oil to be used including the PAO has a kinematic viscosity at 100° C. of 4 to 6 $mm^2/s$.

In the present invention, if the viscosity of the base oil is higher than the above-described numerical range, it is not suitable because the torque performance deteriorates at low temperatures. If the viscosity is lower than the above-described numerical range, it is not suitable because the amount of evaporation increases at high temperatures.

The (a) base oil is preferably included at a proportion of 70% by mass to 90% by mass based on the total mass of the grease composition for resin.

As the (b) thickening agent, lithium soap is used.

The (b) thickening agent is preferably included at a proportion of 3% by mass to 15% by mass based on the total mass of the grease composition for resin.

In the grease composition for resin used in the present invention, the blending proportions of the (a) base oil and the (b) thickening agent are appropriately adjusted so that the NLGI consistency number of the grease composition for resin is 00, 0, 1, or 2.

As the (c) viscosity increasing agent, a polymer or the like that is normally used in a grease composition can be used. Among such polymers, a styrene-isoprene resin and a liquid isoprene rubber are particularly preferable considering the effect as a viscosity increasing agent, the effects on the low temperature starting performance, durability, etc. of the device when used as a grease composition, and the like.

As a styrene-isoprene resin, one having a number average molecular weight of 100,000 to 200,000 can be suitably used, and a styrene-isoprene resin with a higher molecular weight has a greater effect as a viscosity increasing agent. The styrene-isoprene resin to be used in the present invention is not particularly limited and any resin can be suitably used as long as it satisfies the number average molecular weight mentioned above. As specific examples, mention may be made of JSR SIS 5200, 5405, and 5505 made by JSR Corp.; Lubrizol® 7306, 7308, and 7460 made by Lubrizol Corp.; Infineum® SV140, SV150, and SV160 made by Infineum Japan Ltd.; Septon® 1001 and 1020 made by Kuraray Co., Ltd.; and the like.

As the liquid isoprene rubber, a homopolymer-type consisting of isoprene single molecules is preferably used. A copolymer-type liquid isoprene rubber that includes butadiene is not preferable because it causes thermal hardening under heating, or in other words it may present such problems that it causes the grease to solidify and thus reduces mobility when blended into a grease composition.

The liquid isoprene rubber (homopolymer) preferably has a number average molecular weight in the range of 28,000 to 54,000, approximately. In general, if a large amount of a liquid isoprene rubber having a number average molecular weight exceeding 100,000 is included, it may solidify and thus reduce the dispersibility into the base oil. The liquid isoprene rubber to be used in the present invention is not particularly limited and any rubber can be suitably used as long as it has the above-described properties. As specific examples, mention may be made of Kurapuren® LIR-30, LIR-50, LIR-200, and LIR-290 made by Kuraray Co., Ltd.; ISOLENE 40 and 400 made by ROYAL ELASTOMERS; and the like.

If the styrene-isoprene resin or the liquid isoprene rubber is used alone as the (c) viscosity increasing agent, the styrene-isoprene resin is preferably included at a proportion of 0.5% by mass to 6% by mass, and more preferably 2% by mass to 4% by mass, based on the total mass of the grease composition for resin. Further, the liquid isoprene rubber is preferably included at a proportion of 5% by mass to 12% by mass, and more preferably 5% by mass to 8% by mass, based on the total mass of the grease composition for resin.

If both the styrene-isoprene resin and the liquid isoprene rubber are used together as the (c) viscosity increasing agent, they are preferably used together at a proportion such that the mass ratio of the liquid isoprene rubber in relation to the styrene-isoprene resin is in the range of 2 to 5, or in other words such that (mass of liquid isoprene rubber)/(mass of styrene-isoprene resin)=2 to 5. The mixed viscosity increasing component of the styrene-isoprene resin and the liquid isoprene rubber is preferably included at a proportion of 0.9% by mass to 12% by mass, and more preferably 0.9% by mass to 6% by mass, based on the total mass of the grease composition for resin.

In addition to the above, polybutene, polyisobutene, polyisobutylene, and the like can be used as the viscosity increasing agent. However, a poly-alpha-olefin such as PAO100 having a high viscosity or an alpha-olefin copolymer (AOCP) or the like is not preferable because the viscosity may increase at low temperatures.

As the (d) solid lubricant, melamine cyanurate and polytetrafluoroethylene are preferably used together. In particular, in order to most favorably demonstrate the effects of the present invention, it is preferable to use only melamine cyanurate and polytetrafluoroethylene.

Melamine cyanurate and polytetrafluoroethylene are preferably used together such that the mass ratio of melamine cyanurate in relation to polytetrafluoroethylene is in the range of 0.6 to 9, or in other words such that (mass of melamine cyanurate)/(mass of polytetrafluoroethylene)=0.6 to 9. The mixed lubricating component of melamine cyanurate and polytetrafluoroethylene is preferably included at a proportion of 2% by mass to 10% by mass, based on the total mass of the grease composition for resin.

Within a range in which the effects of the present invention are not lost, a solid lubricant that is known in the related art such as calcium carbonate or molybdenum disulfide can be blended as the (d) solid lubricant.

As the (e) anti-wear agent, any one or both of tricresyl phosphate and a polymeric ester are preferably used.

As the polymeric ester, mention may be made of, for example, an ester of aliphatic monovalent and divalent carboxylic acids and polyhydric alcohols. As a specific example of such a polymeric ester, mention may be made of the PRIOLUBE® series made by Croda Japan and the like, but the polymeric ester is not limited thereto.

Any one or both of tricresyl phosphate and a polymeric ester are preferably included at a proportion of 0.5% by mass to 3% by mass, based on the total mass of the grease composition for resin.

Within a range in which the effects of the present invention are not lost, the following can be appropriately selected and added into the grease composition for resin to be used in the actuator of the present invention: an antioxidant, a rust inhibitor, an extreme pressure agent, an oiliness improver, a corrosion inhibitor, and the like.

As an antioxidant, mention may be made of, for example, hindered phenol-type antioxidants such as octadecyl-3-(3,5-di-tert-butyl-4-hydroxyphenyl)propionate, pentaerythritol tetrakis[3-(3,5-di-tert-butyl-4-hydroxyphenyl)propionate], 2,4-bis-(n-octylthio)-6-(4-hydroxy-3,5-di-tert-butylanilino)-1,3,5-triazine, 1,3,5-trimethyl-2,4,6-tris(3,5-di-tert-butyl-4-hydroxybenzyl)benzene, triethylglycol-bis[3-(3-tert-butyl-5-methyl-4-hydroxyphenyl)propionate], 1,6-hexanediol-bis[3-(3,5-di-tert-butyl-4-hydroxyphenyl)propionate], 2,2-thiodiethylenebis[3-(3,5-di-tert-butyl-4-hydroxyphenyl) propionate], N,N'-hexamethylenebis(3,5-di-tert-butyl-4-hydroxy-hydrocinnamide), and the like.

These antioxidants can be used by adding one type alone, or by combining two or more types thereof, and are normally preferably added at a proportion of 0.01% by mass to 5% by mass based on the total mass of the grease composition for resin.

The grease composition for resin having the above-described constitutions not only provides excellent lubricating characteristics to sliding parts such as gears and bearing parts made of a resin, but also can improve bleeding of oil (oil separation) to such parts and provide excellent starting performance (voltage reduction) at low temperatures and excellent anti-wear characteristics.

Therefore, in the actuator of the present invention in which the above-described grease composition for resin is applied to the bearing parts of the gears and the engaging parts between the gears, contamination of the gears and loss of quietness of the gears can be suppressed, and excellent starting performance at low temperatures, noise reduction, and a longer life of the device can be realized.

Here, when considering the present invention, the present invention should not be limited to the actuator discussed hereinabove. The present invention however may be any actuator comprising: a motor; a multi-stage gear device, including a first stage gear attached to a rotation shaft of the motor, wherein a gear of each stage engages with a gear of a next stage; and a base member on which the multi-stage gear device and the motor are mounted, wherein a grease composition for resin is applied to an engaging part between the gears. Further, the present invention may be any gear device at least comprising: a first stage gear attached to a rotation shaft of a motor; a second stage gear engaging with the first stage gear wherein at least one of the first stage gear and the second stage gear is resin-made, and a grease composition is applied to at least an engaging part between the first stage gear and the second stage gear.

A main structure configuring the above actuator and the gear device, or resin members and grease compositions configuring the main structure of the above actuator and the gear device can be constructed according to the actuator hereinabove described.

In addition, in the actuator and the resin gear device, contamination of the gears and loss of quietness of the gears can be suppressed, and excellent starting performance at low temperatures, noise reduction, and a longer life of the device can be realized.

EXAMPLES

The present invention will be explained in further detail below by examples. However, the present invention is not limited to such examples.

[Preparation and Evaluation of Grease Composition]

In the blending amounts shown in the following tables, the (a) base oil and the (b) thickening agent were heated and stirred to dissolve them and then the mixture was cooled. The (c) viscosity increasing agent, the (d) solid lubricant, and the (e) anti-wear agent as well as an antioxidant were added thereto and then homogenized with a roller mill. Thereby, grease compositions for use in Examples 1 to 20 and Comparative Examples 1 to 9 were prepared.

The details and abbreviated names for each component used in the preparation of the grease compositions are provided below.

(a) Base Oil
  PAO: poly-α-olefin (kinematic viscosity at 100° C.: 4 mm$^2$/s)
(b) Thickening Agent
  Li soap: lithium 12-hydroxystearate
(c) Viscosity Increasing Agent
  SIP: styrene-isoprene resin (Infineum® SV150)
  LIR: liquid isoprene rubber (Kurapuren® LIR-50)
(d) Solid Lubricant
  PTFE: polytetrafluoroethylene (particle size of 10 to 25 µm)
  MCA: melamine cyanurate (particle size of 15 to 30 µm)
(e) Anti-Wear Agent
  TCP: tricresyl phosphate
  polymeric ester: PRIOLUBE® 3986 made by Croda Japan
(Other Additives)
  hindered phenol-type antioxidant: pentaerythritol tetrakis [3-(3,5-di-tert-butyl-4-hydroxyphenyl)propionate]

With regard to the characteristics of the obtained grease compositions, the worked penetration and the degree of oil separation were evaluated using the following procedures.

(1) Worked Penetration (JIS K2220 7.)

This is an evaluation of the hardness in terms of external appearance of a grease, and can be said to correspond to the viscosity of a lubricating oil.

Test Temperature: 25° C.

Test Method: the worked penetration was measured in accordance with the procedures of a worked penetration test using a standard circular cone based on JIS K2220 7.

(2) Degree of Oil Separation Test (JIS K2220 11.)

The degree of oil separation is an evaluation of the oil separation tendencies of a grease under static conditions.

In order to measure the degree of oil separation, 20 g of each grease composition, which is a sample, is put into a filter using a conical wire mesh and then suspended in a beaker of a known weight and maintained for a defined time (24 hours) within a thermostatic chamber at a defined temperature (100° C.). After cooling, the weight of the separated oil in the beaker is measured and then calculated as a mass % relative to the sample. The mass % of the obtained separated oil was then evaluated according to the following standards. If the numerical value of the mass % of the separated oil is high (if the oil separation of the grease is high), then the storage stability is poor and thus such a grease is also undesirable for use over a long period of time on a bearing and the like.

Temperature: 100° C., Time: 24 hours

[Evaluation: Mass % of Separated Oil]

0% by mass or more and 7% by mass or less: ○ (usable)

More than 7% by mass: x (unusable)

[Evaluation by Actual Actuator]

Using the above-described grease compositions, low temperature starting performance was evaluated by measuring a starting voltage at low temperatures and durability was evaluated by measuring noise after a cycle test under a constant load.

As the actual actuator, an actuator having the essential structure shown in FIG. 1 as described above was used.

(3) Low Temperature Starting Performance Evaluation (Measurement of Starting Voltage by Actual Actuator)

Load: 20 Ncm, Ambient Temperature: −40° C.

[Evaluation: Starting Voltage]

The values of starting voltage that were measured were evaluated according to the following criteria.

Less than 9 V: ⊙ (particularly excellent low temperature starting performance)

9 V or more and less than 12 V: ○ (excellent low temperature starting performance)

12 V or more and less than 13 V: Δ (acceptable low temperature starting performance)

13 V or more: x (poor low temperature starting performance)

(4) Durability Evaluation (Measurement of Noise after Durability Test by Actual Actuator)

Load: 35 Ncm

Figure 3:
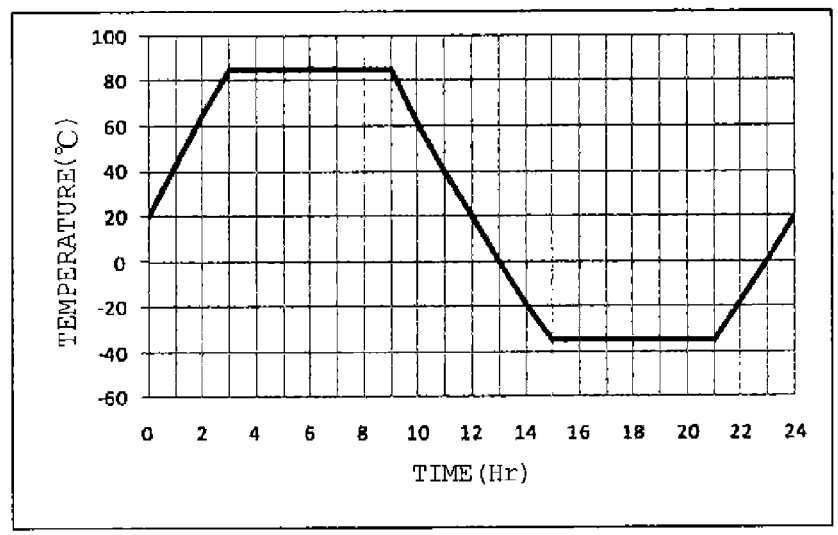
FIG. 3 is a graph illustrating temperature cycle conditions in a durability evaluation (measurement of noise produced by an actual actuator) carried out in the examples.

Ambient Temperature: the test was carried out in a thermostatic chamber under cycle conditions of −30° C. to 85° C. (refer to FIG. 3).

Figure 4:
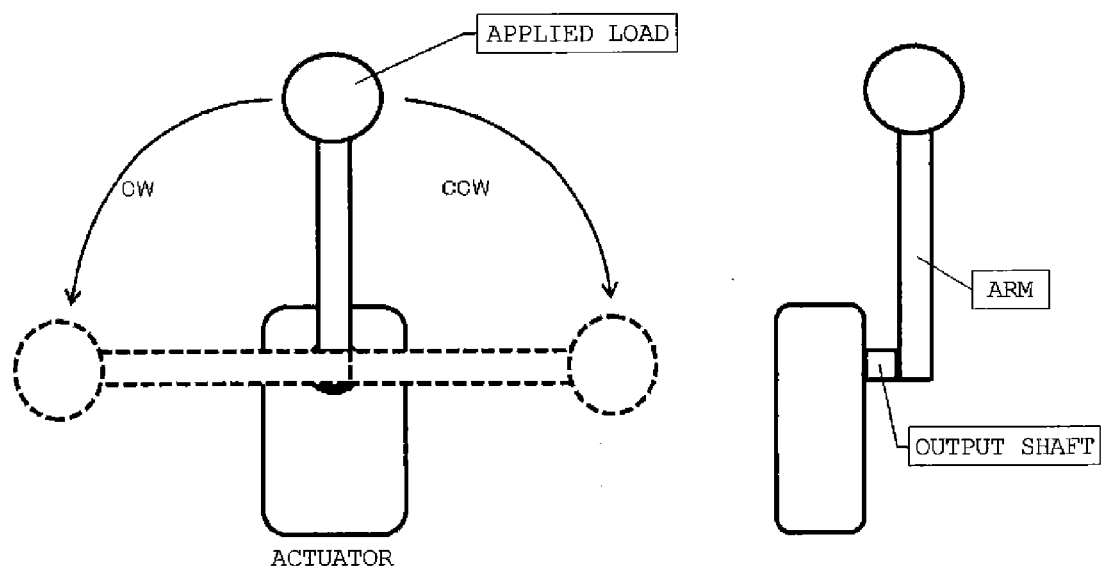
FIG. 4 is a schematic view illustrating a test method of the durability evaluation (noise measurement) carried out in the examples.

As shown in FIG. 4, an arm and a weight (applied load) were mounted on the output shaft of the actual actuator, and the arm and the weight attached to the actuator output shaft were continuously operated in a reciprocal motion (one cycle corresponding to one reciprocal motion of CW and CCW movements) for 45,000 cycles (approximately 15 seconds per cycle) under the temperature condition specified above.

After the continuous operation under the load and temperature conditions described above, a microphone was placed at a position approximately 100 mm away from the actuator to measure noise (acoustic pressure). The noise prior to the durability test was approximately 28 dB. The noise was evaluated according to the following criteria.

[Noise Evaluation]

35 dB or Less: ○ (good noise level as an actuator)

More than 35 dB and less than 40 dB: Δ (acceptable noise level as an actuator)

40 dB or more: x (unacceptable noise level as an actuator)

[Evaluation of Wear of Bearing Part]

(5) Wear Test Evaluation

Figure 5:
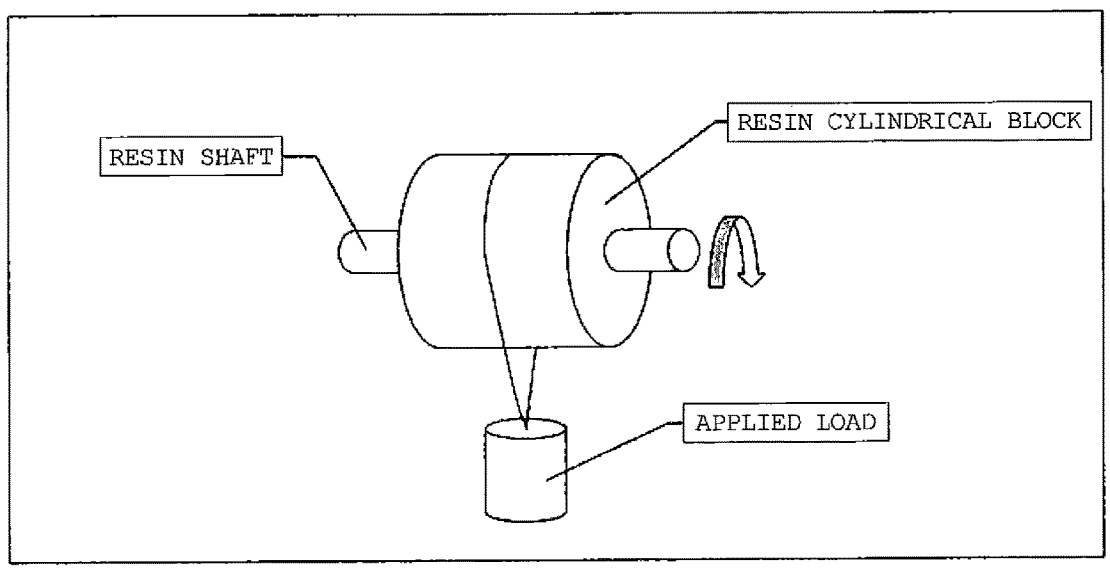
FIG. 5 is a conceptual view of a device used in a wear test carried out in the examples.

As shown in the conceptual view of a wear test in FIG. 5, a load test by a resin shaft and a resin cylindrical block was carried out to evaluate the wear resistance (wear of bearing part).

[Measurement Conditions]

Resin Shaft Diameter: 4 mm diameter, Resin Material: polybutylene terephthalate (PBT) including 30% glass filler Resin Cylindrical Block: 10 mm diameter, Resin Material: polyacetal (POM) (no glass filler)

Load: 30 Ncm, Temperature: room temperature (about 25° C.)

Shaft Circumferential Velocity 20 rpm 4.2 mm/s

Test Time: 500 hours

[Procedure]

Each grease composition was applied to the outer peripheral surface of the resin shaft shown in FIG. 5 (conceptual view), and then the resin shaft was inserted into the resin cylindrical block. A weight (applied load) was attached to the cylindrical block to apply a load, and then the resin shaft was connected to a rotator (not illustrated) and rotated. After rotating under the conditions shown in Measurement Conditions described above, the outer peripheral surface of the resin shaft in contact with the cylindrical block was observed.

[Evaluation]

After the durability test, the wear condition on the outer peripheral surface of the resin shaft in contact with the cylindrical block was visually observed and evaluated according to the following criteria.

○: no wear observed x: wear observed (exposure of glass fibers)

Examples 1 to 6 and Comparative Examples 1 and 2

Various evaluations were carried out using grease compositions prepared by making various adjustments to the added amount of a styrene-isoprene resin (SIP). The obtained results are shown in Table 1.

TABLE 1

| (Blending Amounts: | | Comp. Ex. | Examples | | | | | | Comp. Ex. |
|---|---|---|---|---|---|---|---|---|---|
| parts by mass) | | 1 | 2 | 1 | 3 | 4 | 5 | 6 | 2 |
| (a) | PAO (4 mm²/s at 100° C.) | 75 | 76 | 78 | 79 | 80 | 81 | 81.5 | 82 |

TABLE 1-continued

| (Blending Amounts: parts by mass) | | Comp. Ex. 1 | Examples 2 | Examples 1 | Examples 3 | Examples 4 | Examples 5 | Examples 6 | Comp. Ex. 2 |
|---|---|---|---|---|---|---|---|---|---|
| (b) | Li soap | 5 | 5 | 5 | 5 | 5 | 5 | 5 | 5 |
| (c) | SIP | 8 | 6 | 4 | 3 | 2 | 1 | 0.5 | 0 |
|  | LIR | — | — | — | — | — | — | — | — |
| (d) | PTFE | 5 | 5 | 5 | 5 | 5 | 5 | 5 | 5 |
|  | MCA | 5 | 5 | 5 | 5 | 5 | 5 | 5 | 5 |
| (e) | TCP | 2 | 2 | 2 | 2 | 2 | 2 | 2 | 2 |
|  | Hindered phenol-type antioxidant | 1 | 1 | 1 | 1 | 1 | 1 | 1 | 1 |
|  | Worked Penetration (25° C., 60 W) | 320 | 320 | 320 | 320 | 320 | 320 | 320 | 320 |
|  | Degree of Oil Separation Actual Measured Value (mass %) | 0 | 0 | 0 | 0.8 | 2.8 | 5.3 | 6.4 | 10 |
|  | Evaluation | ○ | ○ | ○ | ○ | ○ | ○ | ○ | x |
|  | Low Temperature Starting Performance Actual Measured Value (V) | 14 | 12.5 | 11.5 | 10.5 | 9.5 | 9 | 8.5 | 8 |
|  | Evaluation | x | Δ | ○ | ○ | ○ | ○ | ⊙ | ⊙ |
|  | Noise Evaluation after Durability Test | ○ | ○ | ○ | ○ | ○ | ○ | Δ | x |
|  | Wear Resistance Evaluation | ○ | ○ | ○ | ○ | ○ | ○ | ○ | ○ |

As shown in Table 1, when the content of the (c) styrene-isoprene resin, which is a solid resin, was increased, the viscosity increased and this led to poor results in starting performance at low temperature.

On the other hand, as the viscosity increased due to the increase in the content of the (c) styrene-isoprene resin, an improvement in the covering capability of the grease over the gears and bearing parts was observed, and this led to good results in the noise evaluation after the durability test and the wear resistance. When the content of the (c) styrene-isoprene resin was low, the covering capability of the grease decreased, and this led to results associated with poor noise evaluation.

Examples 7 to 9 and Comparative Examples 3 and 4

Various evaluations were carried out using grease compositions prepared by making various adjustments to the added amount of a liquid isoprene rubber (LIR). The obtained results are shown in Table 2.

TABLE 2

| (Blending Amounts: parts by mass) | | Comp. Ex. 3 | Examples 7 | Examples 8 | Examples 9 | Comp. Ex 4 |
|---|---|---|---|---|---|---|
| (a) | PAO (4 mm²/s at 100° C.) | 68 | 70 | 74 | 77 | 79 |
| (b) | Li soap | 5 | 5 | 5 | 5 | 5 |
| (c) | SIP | — | — | — | — | — |
|  | LIR | 14 | 12 | 8 | 5 | 3 |
| (d) | PTFE | 5 | 5 | 5 | 5 | 5 |
|  | MCA | 5 | 5 | 5 | 5 | 5 |
| (e) | TCP | 2 | 2 | 2 | 2 | 2 |
|  | Hindered phenol-type antioxidant | 1 | 1 | 1 | 1 | 1 |
|  | Worked Penetration (25° C., 60 W) | 320 | 320 | 320 | 320 | 320 |

TABLE 2-continued

| (Blending Amounts: parts by mass) | Comp. Ex. 3 | Examples 7 | Examples 8 | Examples 9 | Comp. Ex 4 |
|---|---|---|---|---|---|
| Degree of Oil Separation Actual Measured Value (mass %) | 5.5 | 6.0 | 6.8 | 6.8 | 8.5 |
| Evaluation | ○ | ○ | ○ | ○ | x |
| Low Temperature Starting Performance Actual Measured Value (V) | 14 | 12.5 | 10 | 9.5 | 8.5 |
| Evaluation | x | Δ | ○ | ○ | ⊙ |
| Noise Evaluation after Durability Test | ○ | ○ | ○ | Δ | x |
| Wear Resistance Evaluation | ○ | ○ | ○ | ○ | ○ |

As shown in Table 2, since the (c) liquid isoprene rubber is in liquid form, good results were achieved with respect to low temperature starting performance, durability (noise evaluation), and durability (reduction in wear of shaft) even when the absolute amount of the (c) liquid isoprene rubber was high in comparison with the (c) styrene-isoprene resin shown in Table 1, which is a solid resin. However, when the added amount of the (c) liquid isoprene rubber was extremely high such as 14% by mass, the viscosity increased and this led to poor results with respect to low temperature starting performance.

Examples 10 to 13

Various evaluations were carried out using grease compositions prepared by using a styrene-isoprene resin (SIP) and a liquid isoprene rubber (LIR) together and making various adjustments to the added amounts of each. The obtained results are shown in Table 3.

TABLE 3

| (Blending Amounts: parts by mass) | | Examples | | | |
|---|---|---|---|---|---|
| | | 10 | 11 | 12 | 13 |
| (a) | PAO (4 mm$^2$/s at 100° C.) | 76 | 70 | 81.1 | 80.2 |
| (b) | Li soap | 5 | 5 | 5 | 5 |
| (c) | SIP | 2 | 2 | 0.3 | 0.3 |
| | LIR | 4 | 10 | 0.6 | 1.5 |
| (d) | PTFE | 5 | 5 | 5 | 5 |
| | MCA | 5 | 5 | 5 | 5 |
| (e) | TCP | 2 | 2 | 2 | 2 |
| | Hindered phenol-type antioxidant | 1 | 1 | 1 | 1 |
| | LIR/SIP Mass Ratio | 2.0 | 5.0 | 2.0 | 5.0 |
| | Worked Penetration (25° C., 60 W) | 320 | 320 | 320 | 320 |
| | Degree of Oil Separation Actual Measured Value (mass %) | 2.5 | 1.2 | 6 | 0 |
| | Evaluation | ○ | ○ | ○ | ○ |
| | Low Temperature Starting Performance Actual Measured Value (V) | 10 | 12 | 8.5 | 9 |
| | Evaluation | ○ | ○ | ⊙ | ○ |
| | Noise Evaluation after Durability Test | ○ | ○ | Δ | Δ |
| | Wear Resistance Evaluation | ○ | ○ | ○ | ○ |

As shown in Table 3, results that generally satisfied each evaluation category were obtained by using a grease composition in which the mass ratio of liquid isoprene rubber in relation to styrene-isoprene resin was within the range of 2 to 5 corresponding to a total added amount of 0.9 to 12% by mass. However, as shown in Example 12, when the added amount of the viscosity increasing agent was reduced to 0.9% by mass, the obtained results showed excellent low temperature starting performance but reduced durability in an actual actuator.

Example 1 (Repeated) and Examples 14 to 17

Various evaluations were carried out using grease compositions prepared by varying the mass ratio between polytetrafluoroethylene (PTFE) and melamine cyanurate (MCA). The obtained results are shown in Table 4.

TABLE 4

| (Blending Amounts: parts by mass) | | Examples | | | | |
|---|---|---|---|---|---|---|
| | | 14 | 15 | 1 | 16 | 17 |
| (a) | PAO (4 mm$^2$/s at 100° C.) | 86 | 86 | 78 | 78 | 78 |
| (b) | Li soap | 5 | 5 | 5 | 5 | 5 |
| (c) | SIP | 4 | 4 | 4 | 4 | 4 |
| | LIR | — | — | — | — | — |
| (d) | PTFE | 1.2 | 0.2 | 5 | 6 | 1 |
| | MCA | 0.8 | 1.8 | 5 | 4 | 9 |
| (e) | TCP | 2 | 2 | 2 | 2 | 2 |
| | Hindered phenol-type antioxidant | 1 | 1 | 1 | 1 | 1 |
| | MCA/PTFE Mass Ratio | 0.7 | 9 | 1.0 | 0.7 | 9 |
| | Worked Penetration (25° C., 60 W) | 320 | 320 | 320 | 320 | 320 |
| | Degree of Oil Separation Actual Measured Value (mass %) | 1.2 | 0.9 | 2.8 | 1.7 | 2.5 |
| | Evaluation | ○ | ○ | ○ | ○ | ○ |
| | Low Temperature Starting Performance Actual Measured Value (V) | 11.5 | 11.5 | 11.5 | 11.5 | 11.5 |
| | Evaluation | ○ | ○ | ○ | ○ | ○ |
| | Noise Evaluation after Durability Test | ○ | ○ | ○ | ○ | ○ |
| | Wear Resistance Evaluation | ○ | ○ | ○ | ○ | ○ |

As shown in Table 4, results that satisfied every evaluation category were obtained by using a grease composition in which the mass ratio of melamine cyanurate in relation to polytetrafluoroethylene was within the range of 0.6 to 9 corresponding to a total added amount of 2 to 10% by mass.

Example 1 (Repeated) and Examples 18 to 20 and Comparative Example 9

Various evaluations were carried out using grease compositions prepared by varying the blending proportion of tricresyl phosphate (TCP) or polymeric ester. The obtained results are shown in Table 5.

TABLE 5

| (Blending Amounts: parts by mass) | | Examples | | | | Comp. Ex. |
|---|---|---|---|---|---|---|
| | | 18 | 1 | 19 | 20 | 9 |
| (a) | PAO (4 mm$^2$/s at 100° C.) | 77 | 78 | 79.5 | 78 | 80 |
| (b) | Li soap | 5 | 5 | 5 | 5 | 5 |
| (c) | SIP | 4 | 4 | 4 | 4 | 4 |
| | LIR | — | — | — | — | — |
| (d) | PTFE | 5 | 5 | 5 | 5 | 5 |
| | MCA | 5 | 5 | 5 | 5 | 5 |
| (e) | TCP | 3 | 2 | 0.5 | — | 0 |
| | Polymeric ester | — | — | — | 2 | — |
| | Hindered phenol-type antioxidant | 1 | 1 | 1 | 1 | 1 |
| | Worked Penetration (25° C., 60 W) | 320 | 320 | 320 | 320 | 320 |
| | Degree of Oil Separation Actual Measured Value (mass %) | 2.8 | 2.8 | 2.8 | 2.8 | 2.8 |
| | Evaluation | ○ | ○ | ○ | ○ | ○ |
| | Low Temperature Starting Performance Actual Measured Value (V) | 11.5 | 11.5 | 11.5 | 11.5 | 11.5 |
| | Evaluation | ○ | ○ | ○ | ○ | ○ |
| | Noise Evaluation after Durability Test | ○ | ○ | ○ | ○ | ○ |
| | Wear Resistance Evaluation | ○ | ○ | ○ | ○ | x |

As shown in Table 5, the examples using a grease composition in which tricresyl phosphate or polymeric ester were added exhibited excellent wear resistance, whereas Comparative Example 9 using a grease composition that did not contain tricresyl phosphate and polymeric ester exhibited poor wear resistance.

From the results of Examples 1 to 20 shown in Tables 1 to 5 above, it was confirmed that the use in an actuator of a grease composition containing a liquid isoprene rubber and/or a styrene-isoprene resin as a viscosity increasing agent was effective with respect to starting performance at low temperatures and durability (noise evaluation and reduction in wear of shaft). Further, in the case of using a grease composition in which the added amount of the viscosity increasing agent was increased beyond a suitable range, the viscosity at low temperatures increased and this led to poor results with respect to starting performance.

Optimal embodiments were explained in detail above, but the present invention is not limited to the above embodiments, and modifications, improvements, and the like within the range in which the object of the present invention can be achieved are also included within the present invention.

What is claimed is:

1. An actuator comprising:
a stepping motor;
a multi-stage gear device for decelerating a rotation of the stepping motor in order so as to increase rotational torque, including a first stage gear attached to a rotation shaft of the stepping motor, wherein a gear of each stage engages with a gear of a next stage; and
a base member on which the multi-stage gear device and the stepping motor are mounted,
wherein in the multi-stage gear device, a grease composition for resin is applied to a bearing part of the gear and to an engaging part between the gears, and the grease composition for resin includes:
(a) a base oil including a poly-alpha-olefin oil with a kinematic viscosity at 100° C. of 4 to 6 mm$^2$/s;
(b) a thickening agent which is lithium soap;
(c) a viscosity increasing agent;
(d) a solid lubricant; and
(e) an anti-wear agent, and
wherein the NLGI (National Lubricating Grease Institute) consistency number of the composition is 00, 0, 1, or 2.

2. The actuator according to claim 1, wherein the (c) viscosity increasing agent includes any one or both of a styrene-isoprene resin and a liquid isoprene rubber.

3. The actuator according to claim 2, wherein the (c) viscosity increasing agent includes the styrene-isoprene resin at a proportion of 0.5% by mass to 6% by mass or includes the liquid isoprene rubber at a proportion of 5% by mass to 12% by mass based on the total mass of the grease composition for resin.

4. The actuator according to claim 2, wherein the (c) viscosity increasing agent includes the styrene-isoprene resin and the liquid isoprene rubber at a proportion such that a mass ratio of the liquid isoprene rubber in relation to the styrene-isoprene resin is within a range of 2 to 5, and a mixed viscosity increasing component of the styrene-isoprene resin and the liquid isoprene rubber is included at a proportion of 0.9% by mass to 12% by mass based on the total mass of the grease composition for resin.

5. The actuator according to claim 1, wherein the (d) solid lubricant includes melamine cyanurate and polytetrafluoroethylene such that a mass ratio of melamine cyanurate in relation to polytetrafluoroethylene is within a range of 0.6 to 9, and
a mixed lubricating component of the melamine cyanurate and the polytetrafluoroethylene is included at a proportion of 2% by mass to 10% by mass based on the total mass of the grease composition for resin.

6. The actuator according to claim 5, wherein the (d) solid lubricant consists of melamine cyanurate and polytetrafluoroethylene.

7. The actuator according to claim 1, wherein the (e) anti-wear agent includes any one or both of tricresyl phosphate and a polymeric ester, and
any one or both of the tricresyl phosphate and the polymeric ester are included at a proportion of 0.5% by mass to 3% by mass based on the total mass of the grease composition for resin.

8. An actuator comprising:
a motor;
a multi-stage gear device, including a first stage gear attached to a rotation shaft of the motor, wherein a gear of each stage engages with a gear of a next stage; and
a base member on which the multi-stage gear device and the motor are mounted,
wherein a grease composition for resin is applied to an engaging part between the gears, and the grease composition for resin includes:
(a) a base oil including a poly-alpha-olefin oil with a kinematic viscosity at 100° C. of 4 to 6 mm$^2$/s;
(b) a thickening agent which is lithium soap;
(c) a viscosity increasing agent;
(d) a solid lubricant; and
(e) an anti-wear agent, and
wherein the NLGI (National Lubricating Grease institute) consistency number of the composition is 00, 0, 1, or 2.

9. The actuator according to claim 8, wherein the (c) viscosity increasing agent includes any one or both of a styrene-isoprene resin and a liquid isoprene rubber.

10. The actuator according to claim 9, wherein the (c) viscosity increasing agent includes the styrene-isoprene resin at a proportion of 0.5% by mass to 6% by mass or includes the liquid isoprene rubber at a proportion of 5% by mass to 12% by mass based on the total mass of the grease composition for resin.

11. The actuator according to claim 9, wherein the (c) viscosity increasing agent includes the styrene-isoprene resin and the liquid isoprene rubber at a proportion such that a mass ratio of the liquid isoprene rubber in relation to the styrene-isoprene resin is within a range of 2 to 5, and a mixed viscosity increasing component of the styrene-isoprene resin and the liquid isoprene rubber is included at a proportion of 0.9% by mass to 12% by mass based on the total mass of the grease composition for resin.

12. The actuator according to claim 8, wherein the (d) solid lubricant includes melamine cyanurate and polytetrafluoroethylene such that a mass ratio of melamine cyanurate in relation to polytetrafluoroethylene is within a range of 0.6 to 9, and
a mixed lubricating component of the melamine cyanurate and the polytetrafluoroethylene is included at a proportion of 2% by mass to 10% by mass based on the total mass of the grease composition for resin.

13. The actuator according to claim 8, wherein the (e) anti-wear agent includes any one or both of tricresyl phosphate and a polymeric ester, and
any one or both of the tricresyl phosphate and the polymeric ester are included at a proportion of 0.5% by mass to 3% by mass based on the total mass of the grease composition for resin.

14. A gear device at least comprising:
a first stage gear attached to a rotation shaft of a motor; and
a second stage gear engaging with the first stage gear;
wherein at least one of the first stage gear and the second stage gear is resin-made, and a grease composition is applied to at least an engaging part between the first stage gear and the second stage gear, and
wherein the grease composition includes:
(a) a base oil including a poly-alpha-olefin oil with a kinematic viscosity at 100° C. of 4 to 6 mm$^2$/s;
(b) a thickening agent which is lithium soap;
(c) a viscosity increasing agent;

(d) a solid lubricant; and
(e) an anti-wear agent, and
wherein the NLGI (National Lubricating Grease Institute) consistency number of the composition is 00, 0, 1, or 2.

15. The gear device according to claim 14, wherein the (c) viscosity increasing agent includes any one or both of a styrene-isoprene resin and a liquid isoprene rubber.

16. The gear device according to claim 15, wherein the (c) viscosity increasing agent includes the styrene-isoprene resin at a proportion of 0.5% by mass to 6% by mass or includes the liquid isoprene rubber at a proportion of 5% by mass to 12% by mass based on the total mass of the grease composition for resin.

17. The gear device according to claim 15, wherein the (c) viscosity increasing agent includes the styrene-isoprene resin and the liquid isoprene rubber at a proportion such that a mass ratio of the liquid isoprene rubber in relation to the styrene-isoprene resin is within a range of 2 to 5, and a mixed viscosity increasing component of the styrene-isoprene resin and the liquid isoprene rubber is included at a proportion of 0.9% by mass to 12% by mass based on the total mass of the grease composition for resin.

18. The gear device according to claim 14, wherein the (d) solid lubricant includes melamine cyanurate and polytetrafluoroethylene such that a mass ratio of melamine cyanurate in relation to polytetrafluoroethylene is within a range of 0.6 to 9, and a mixed lubricating component of the melamine cyanurate and the polytetrafluoroethylene is included at a proportion of 2% by mass to 10% by mass based on the total mass of the grease composition for resin.

19. The gear device according to claim 18, wherein the (d) solid lubricant consists of melamine cyanurate and polytetrafluoroethylene.

20. The gear device according to claim 14, wherein the (e) anti-wear agent includes any one or both of tricresyl phosphate and a polymeric ester, and any one or both of the tricresyl phosphate and the polymeric ester are included at a proportion of 0.5% by mass to 3% by mass based on the total mass of the grease composition for resin.

* * * * *